United States Patent
Sharp et al.

(10) Patent No.: US 9,710,434 B2
(45) Date of Patent: Jul. 18, 2017

(54) SKIM PREVIEW

(71) Applicant: Highspot, Inc., Seattle, WA (US)

(72) Inventors: Oliver Sharp, Seattle, WA (US);
Robert Wahbe, Seattle, WA (US);
David Wortendyke, Seattle, WA (US);
Scot Gellock, Seattle, WA (US)

(73) Assignee: Highspot, Inc., Seattle, WA (US)

( * ) Notice: Subject to any disclaimer, the term of this patent is extended or adjusted under 35 U.S.C. 154(b) by 101 days.

(21) Appl. No.: 14/566,515

(22) Filed: Dec. 10, 2014

(65) Prior Publication Data

US 2015/0161080 A1    Jun. 11, 2015

Related U.S. Application Data

(60) Provisional application No. 61/914,266, filed on Dec. 10, 2013.

(51) Int. Cl.
| | | |
|---|---|---|
| *G06F 17/00* | (2006.01) | |
| *G06F 17/21* | (2006.01) | |
| *G06F 3/0484* | (2013.01) | |
| *G06F 3/0481* | (2013.01) | |

(52) U.S. Cl.
CPC ........ *G06F 17/212* (2013.01); *G06F 3/04812* (2013.01); *G06F 3/04842* (2013.01)

(58) Field of Classification Search
CPC ..................... G06F 17/30876; G06F 17/30884
See application file for complete search history.

(56) References Cited

U.S. PATENT DOCUMENTS

| | | | |
|---|---|---|---|
| 7,814,425 B1 * | 10/2010 | O'Shaugnessy | G06Q 10/107 715/752 |
| 7,970,721 B2 | 6/2011 | Leskovec et al. | |
| 8,014,634 B1 | 9/2011 | Chan | |

(Continued)

FOREIGN PATENT DOCUMENTS

JP        2012185780 A        9/2012

OTHER PUBLICATIONS

International Search Report and Written Opinion for International Application No. PCT/US2013/076962, Mail Date Apr. 22, 2014, 11 pages.

(Continued)

*Primary Examiner* — Mohammed-Ibrahim Zuberi
(74) *Attorney, Agent, or Firm* — Perkins Coie LLP

(57) ABSTRACT

Techniques for identifying and viewing information items within an organization comprising a plurality of users each having one or more roles within the organization is disclosed. The disclosed techniques provide systems and methods for implementing and using a "skim preview" technique for previewing information items. This technique can be applied to a wide variety of information, such as presentations, documents, video, images, and so on and can be used for a variety of applications, including browsing, searching, discovery, and so on. The system can compute sequences that represent interesting visual aspects of the item being viewed. This can be applied to items that do not have a natural set of preview images, or it might be used as an alternative to the natural previews. The preview images may be sequenced chronologically, by importance, or based on any other metric.

21 Claims, 9 Drawing Sheets

(56) References Cited

U.S. PATENT DOCUMENTS

| | | | |
|---|---|---|---|
| 8,402,375 B1* | 3/2013 | Skare | G06F 17/30884 714/744 |
| 8,510,313 B2* | 8/2013 | Vaughan | G06F 17/30876 707/748 |
| 8,554,601 B1 | 10/2013 | Marsh et al. | |
| 8,872,804 B2* | 10/2014 | Martin | G06F 1/3262 345/173 |
| 2004/0267700 A1* | 12/2004 | Dumais | G06F 17/30613 |
| 2005/0267799 A1 | 12/2005 | Chan et al. | |
| 2006/0085427 A1 | 4/2006 | D'Urso | |
| 2006/0129538 A1 | 6/2006 | Baader et al. | |
| 2006/0248045 A1 | 11/2006 | Toledano et al. | |
| 2007/0033517 A1* | 2/2007 | O'Shaughnessy | G06F 17/30884 715/205 |
| 2007/0079384 A1 | 4/2007 | Grinstein et al. | |
| 2007/0088820 A1* | 4/2007 | Kwak | G06F 17/30884 709/224 |
| 2007/0150515 A1 | 6/2007 | Brave et al. | |
| 2008/0154873 A1 | 6/2008 | Redlich et al. | |
| 2008/0306954 A1 | 12/2008 | Hornqvist | |
| 2009/0019026 A1 | 1/2009 | Valdes-Perez et al. | |
| 2009/0106697 A1 | 4/2009 | Ward et al. | |
| 2009/0164431 A1 | 6/2009 | Zivkovic et al. | |
| 2009/0178144 A1 | 7/2009 | Redlich et al. | |
| 2009/0222551 A1 | 9/2009 | Neely et al. | |
| 2010/0070488 A1 | 3/2010 | Sylvain | |
| 2010/0082622 A1 | 4/2010 | Irie et al. | |
| 2010/0146593 A1 | 6/2010 | Stahl et al. | |
| 2010/0198869 A1 | 8/2010 | Kalaboukis et al. | |
| 2010/0235351 A1 | 9/2010 | Iwasa et al. | |
| 2010/0250556 A1 | 9/2010 | Park et al. | |
| 2010/0281389 A1 | 11/2010 | Hutchinson et al. | |
| 2011/0107260 A1 | 5/2011 | Park et al. | |
| 2011/0191679 A1* | 8/2011 | Lin | G06F 17/30781 715/716 |
| 2011/0238754 A1 | 9/2011 | Dasilva | |
| 2012/0001919 A1 | 1/2012 | Lumer | |
| 2012/0066645 A1* | 3/2012 | Laurie | G06F 17/30873 715/811 |
| 2012/0117475 A1 | 5/2012 | Lee et al. | |
| 2012/0131495 A1* | 5/2012 | Goossens | G06F 3/0482 715/782 |
| 2012/0143859 A1 | 6/2012 | Lymperopoulos et al. | |
| 2012/0158751 A1 | 6/2012 | Tseng et al. | |
| 2012/0191715 A1 | 7/2012 | Ruffner et al. | |
| 2012/0197855 A1* | 8/2012 | Chen | G06F 17/3089 707/706 |
| 2012/0271819 A1 | 10/2012 | Qiu et al. | |
| 2012/0278329 A1 | 11/2012 | Borggaard et al. | |
| 2012/0278761 A1 | 11/2012 | John | |
| 2012/0290565 A1 | 11/2012 | Wana et al. | |
| 2012/0290614 A1 | 11/2012 | Nandakumar et al. | |
| 2012/0310926 A1 | 12/2012 | Gannu et al. | |
| 2013/0036114 A1 | 2/2013 | Wong et al. | |
| 2013/0110813 A1 | 5/2013 | Holm et al. | |
| 2013/0124653 A1 | 5/2013 | Vick et al. | |
| 2013/0218923 A1 | 8/2013 | Kaul et al. | |
| 2013/0254280 A1 | 9/2013 | Yang et al. | |
| 2013/0268479 A1 | 10/2013 | Andler et al. | |
| 2014/0006399 A1* | 1/2014 | Vasudevan | G06F 17/30867 707/737 |
| 2014/0089048 A1 | 3/2014 | Bruich et al. | |
| 2014/0089402 A1 | 3/2014 | Liyanage et al. | |
| 2014/0189516 A1* | 7/2014 | Guo | G06F 3/04883 715/719 |
| 2014/0359424 A1* | 12/2014 | Lin | G06F 17/30876 715/234 |
| 2015/0177933 A1* | 6/2015 | Cueto | G06F 3/0483 715/776 |
| 2016/0162591 A1* | 6/2016 | Dokania | G06F 3/0482 707/738 |

OTHER PUBLICATIONS

International Search Report and Written Opinion for International Application No. PCT/US2014029505, Mail Date Jul. 7, 2014, 11 pages.

Screenshot of main page of Speaker Deck website. Taken Dec. 10, 2014 https://speakerdeck.com/.

Screenshot of Frequently Asked Questions page of Speaker Deck website. Taken Dec. 10, 2014 https://speakerdeck.com/faq#file_types.

* cited by examiner

SKIM PREVIEW

RELATED APPLICATIONS

This application claims priority to U.S. Provisional Patent Application No. 61/914,266 filed Dec. 10, 2013, entitled SKIM PREVIEW and is related to U.S. Provisional Patent Application No. 61/745,365 filed Dec. 21, 2012, entitled INTEREST GRAPH-POWERED SEARCH, U.S. Non-provisional patent application Ser. No. 14/136,322, filed Dec. 20, 2013, entitled INTEREST GRAPH-POWERED SEARCH, U.S. Provisional Patent Application No. 61/800,042 filed Mar. 15, 2013, entitled INTEREST GRAPH-POWERED FEED, U.S. Non-provisional patent application Ser. No. 14/214,140, filed Mar. 14, 2014, entitled INTEREST GRAPH-POWERED FEED, U.S. Provisional Patent Application No. 61/800,322, filed Mar. 15, 2013, entitled INTEREST GRAPH-POWERED BROWSING, U.S. Non-provisional application Ser. No. 14/213,505 filed Mar. 14, 2014, entitled INTEREST GRAPH-POWERED BROWSING, U.S. Provisional Patent Application No. 61/800,497 filed Mar. 15, 2013, entitled INTEREST GRAPH-POWERED SHARING, U.S. Non-provisional patent application Ser. No. 14/213,983 filed Mar. 14, 2014, entitled INTEREST GRAPH-POWERED SHARING, and U.S. Provisional Patent Application No. 62/037,956 filed Aug. 15, 2014, entitled FEED, all of which are incorporated by reference in their entireties.

BACKGROUND

Currently, applications do not allow a user to quickly preview the contents of items of information, such as presentations, documents, video, images, etc. Typically, items of information need to be opened in a designated application (e.g., MICROSOFT WORD, ADOBE ACROBAT, APPLE'S KEYNOTE) or instance of the designated application to view the contents (e.g., pages, slides, image portions, frames) of an item of information. The need exists for a system that allows a user to preview the contents of items of information.

Overall, the examples herein of some prior or related systems and their associated limitations are intended to be illustrative and not exclusive. Other limitations of existing or prior systems will become apparent to those of skill in the art upon reading the following Detailed Description.

DETAILED DESCRIPTION

A system and method for implementing and using a "skim preview" technique for previewing items of information quickly is disclosed. This technique can be applied to a wide variety of information, such as presentations, documents, video, images, and so on and can be used for a variety of applications, including browsing, searching, discovery, and so on.

In some embodiments, skim preview works by tracking the movement of a cursor or other pointing mechanism (e.g., mouse cursor, touch pad cursor, finger) across an item, such as an e-book, slide presentation, and so on and, based on the location of the cursor, showing a dynamically changing preview image for the item and a progress indicator. For example, while moving from the left edge of the item to the right edge (or right to left), each small motion by the cursor could cause a preview image of the next page of the item to be rendered. Thus, by sliding all the way across the item, all (or some) the preview images of pages of the item can be seen.

Figure 1:
FIG. 1 is a display page illustrating three panes reflecting how skim preview works with an electronic book in accordance with some embodiments of the disclosed technology.

FIG. 1 is a display page illustrating three panes reflecting how skim preview works with an electronic book in accordance with some embodiments of the disclosed technology. In the first pane, the cursor has not yet touched the item, and the image shown is the title page. The cursor is moved to the right by the user. When the cursor touches the item in pane 2, the system computes the distance the cursor has moved from the item's left edge. Based on that computation, the system shows the preview image for a corresponding page in the document and updates the progress bar, which provides an indication of which page the user is viewing. As the user continues to move the cursor to the right, the preview image continually updates to show later pages in the book. Conversely, if moving to the left, the preview image continually updates to show earlier pages in the book. In pane 3, the user has moved more than half way across the item, and the preview image is of a corresponding page (i.e., a page more than half way through the item) and the progress bar has been updated to show how far the previewing has moved through the item. Although the example described above is from the context of an item written in a left-to-right language, one of ordinary skill in the art will recognize that the example could be adapted to skim preview items written in a right-to-left language, such that when the cursor is closer to the right of the item preview images of earlier pages of the item are rendered and preview images of later pages of the item are rendered as the cursor is moved from right to left. Similarly, the progress bar could be modified to reflect this difference in orientation.

In some embodiments, skim preview can be used to find a particular part of an item that is of interest, such as a particular page or image within the item, by moving the cursor across the item to view preview images of different parts of the item. Once the preview image of the particular part has been displayed, the user can click on that preview image to be taken to the corresponding part of the item. For example, the user could use skim preview to view preview images of presentation slides, find one corresponding to a slide of interest, then click on the preview image to open that particular slide in a full-size view.

In some embodiments, the area that is tracked for skim previewing referred to as a "skim surface." When the cursor is on or within the skim surface, movement of the cursor will be tracked and used to adjust the preview image to reflect the current position of the cursor. The skim surface can be the entire item, as shown in FIG. 1. Alternatively, the skim surface can be restricted to a part of the item, such as the bottom third of the area where the item pages are displayed, or it could be separate from the area where the item is displayed (for example, the skim surface could be above, below, or to the side of the item).

Figure 2:
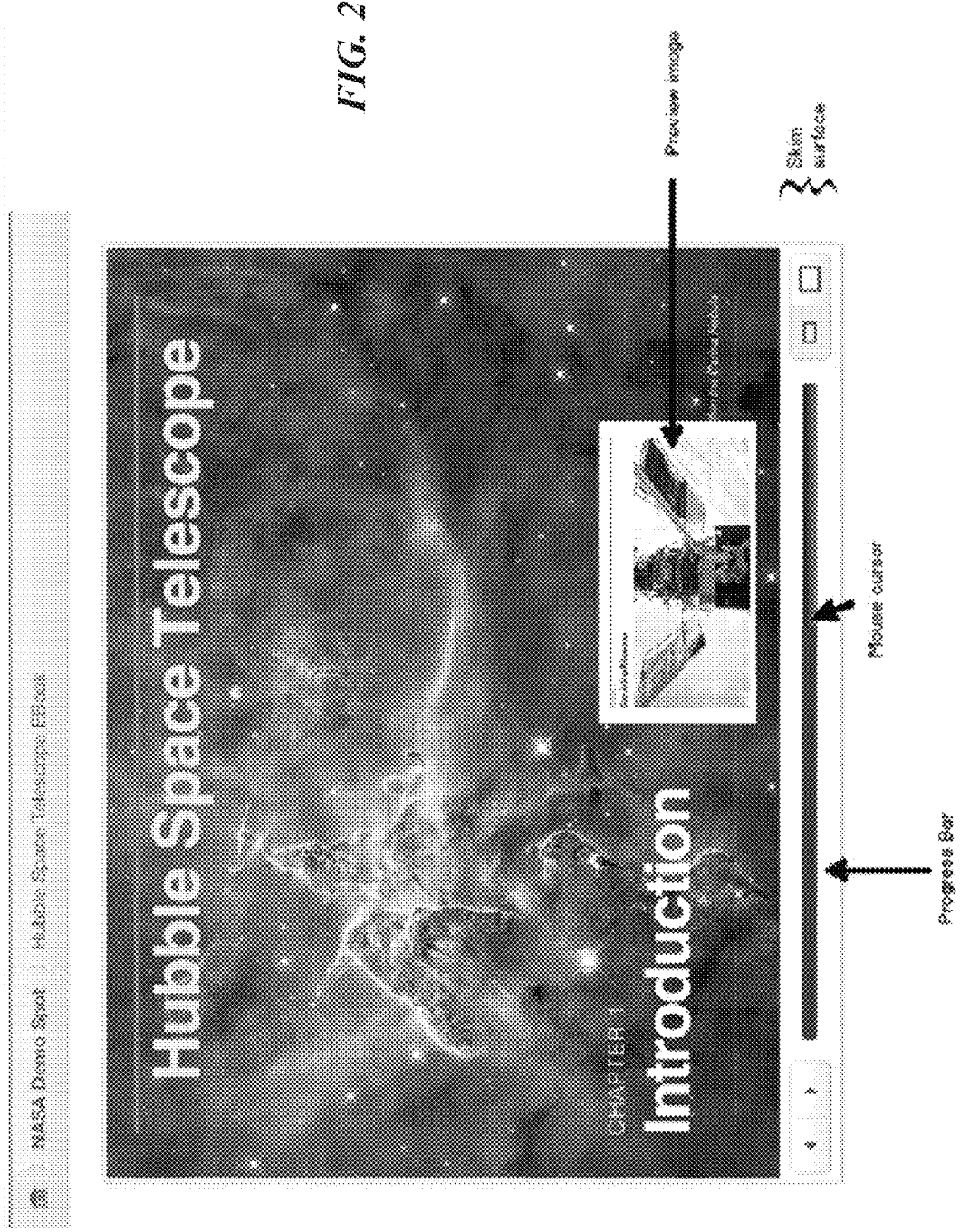
FIG. 2 is a display page illustrating previewing an item using a skim surface in accordance with some embodiments of the disclosed technology.

FIG. 2 is a display page illustrating previewing an item using a skim surface in accordance with some embodiments of the disclosed technology. In FIG. 2, a strip at the bottom of the reading experience being used as a skim surface. Sliding the cursor anywhere in the strip at the bottom causes the corresponding preview image to be displayed. When the cursor is moved from within the skim surface, movement of the cursor will not change the preview image. Thus, if the cursor is anywhere on the screen outside of the skim surface, movement of the cursor does not trigger skim preview. The preview image that is shown corresponds to the location in the skim surface where the cursor is currently positioned (or was positioned when the cursor left the skim surface). The progress bar provides an indication of where in the current item the currently displayed preview image is, relative to the current item as a whole.

Computing the Preview Images

To apply skim preview to an item, the system determines an appropriate set of images to show. In some embodiments, this set is:
- a one-dimensional sequence, if skim preview is only supported in a single dimension (e.g., left to right and right to left (horizontally) or up and down and down and up (vertically), or,
- a multi-dimensional mosaic or set of sequences, if multiple dimensions are supported (e.g., left to right (and right to left) AND up and down (and down and up).

Figure 3:
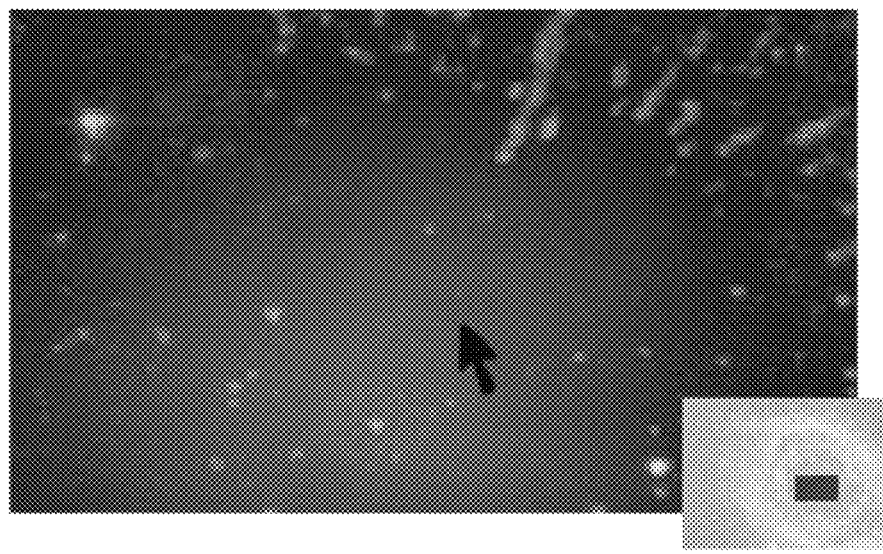
FIG. 3 is a display page illustrating a multi-dimensional skim preview in accordance with some embodiments of the disclosed technology.

FIG. 3 is a display page illustrating a multi-dimensional skim preview in accordance with some embodiments of the disclosed technology. In this example, a user can move between preview images of an item by moving, for example, the cursor left, right, up, or down. A mosaic of images could be navigated by tracking the cursor horizontally and vertically at the same time, as shown in FIG. 3. In some embodiments, an item may be split up into different sections (e.g., chapters of a book or DVD or sections of a newspaper). The disclosed system may enable a user to move between representative preview images of each section (e.g., the first page or screen of each section) by moving vertically and move between preview images of each element (e.g., page, slide, frame) or a subset of the elements of an item by moving horizontally.

For many types of content, there is a natural sequence or mosaic that can be computed from an item of information of that type. For example, in the case of a slide presentation, the natural sequence is a preview of each slide in order. Moving the cursor back and forth scrolls backwards and forwards through the slides. The sequence does not have to include every slide. For example, the system may select a subset of the slides, weighting some as being more important than others based on, for example, how frequently or how long each slide has been viewed by the users of the system.

Documents (including books, pamphlets, articles, and so forth) are naturally represented by an image of each of their individual pages but may be skim previewed using a subset of those individual pages based on weight or importance (e.g., how frequently or how long the page has been viewed by users of the system).

Videos are a sequence of still images, often a very large number of them, so it is typically appropriate to preview by sampling periodic images from that sequence (one still image per second of video (or any predetermined number of still images per unit of time), for example). As the user skims, they see an approximation of the video. They can quickly move back and forth, previewing any part of the video they are interested in.

The system can compute sequences that represent interesting visual aspects of the item being viewed. This can be applied to items that do not have a natural set of preview images, or it might be used as an alternative to the natural previews. For example, if the user were to skim over the profile image of a person, some set of images representing the history of their activity or contributions over time could be previewed. By sliding from the left to the right and right to left, the visual representation would represent a timeline. It could contain the title page of items the person has authored or uploaded, pictures that relate to the person or to the person's activities over time, comments and other contributions the person has made, and the like. Alternatively, the sequence might be the set of people the person has interacted with, the set of roles the person has had historically, and so on. The preview images may be sequenced chronologically, by importance, or based on any other metric.

For a group of people, the preview images could be the union of the images for each person in the group, or profile pictures of each member (sorted alphabetically, by order of joining the group, or by a computed metric. An example of a computed metric would be "influence", such as the number of followers the user has or the amount of activity that has happened against items that the user has added to the system.

The preview images for a collection of items might show a title page of each item in it, sorted chronologically, by popularity, based on a manual order defined by their owner, and/or by some measure of importance based on the amount of user activity that has been applied to each item in the collection. For example, the total number of times that an item has been viewed by any user, or the total amount of time that users have spent viewing the item.

For an organization (like a company or government), or a community (like a country, city, or the like), skim preview might show a historical timeline of events for the organization or community, images that represent the people that are part of those entities, a historical record of the people who led them, or an image on a map of their location or influence. For example, the skim preview for the Roman Empire might show a series of map images that represent the extent of the empire over time, so users could skim back and forth to see the growth and end of the empire over time. As another example, skimming over an image of the United States might show a portrait and some vital statistics for each President of the United States, in order of time.

Preview images for a graph might show values for different historical periods, allowing users to scan for historical trends and compare those against the current value. For example, the skim preview could display, for a particular year, a bar graph showing the lifespan distribution. Each bar graph may break out, for each decade (e.g., ages 0-9, 10-19, 20-29), the percentage of the population who lived to that range of ages. By skimming back and forth, a user could visually see how lifespan distributions have changed over time.

Preview images for an image, map, diagram, etc. might show pieces of the image, map, diagram, etc., allowing the user to examine the whole item as if they were moving a magnifying glass around to see a part of it more closely. In this case, it might be appropriate to skim both vertically and horizontally, as shown in FIG. 3. By moving the cursor up and down as well as sideways, the user can skim across a 2-D space, previewing any part of the image, map, diagram, etc.

Preview images for a web page might use a sequence (rendered horizontally, perhaps, if the page is short and wide, and vertically if it is tall and slender) or it might use a mosaic (if it is large enough to need skimming horizontally and vertically to see all of its contents).

Applications for Skim

Skim can be used to support a variety of use activities.

Browsing

Users often find information by browsing through bodies of content. A piece of content is often linked to related items, or items are grouped together. The user navigates through the items by category or by link, looking for something they are interested in. With skim preview, when an item is referenced, a small version of the item can be shown and the user can move their cursor over it to preview contents of the item.

Figure 4:
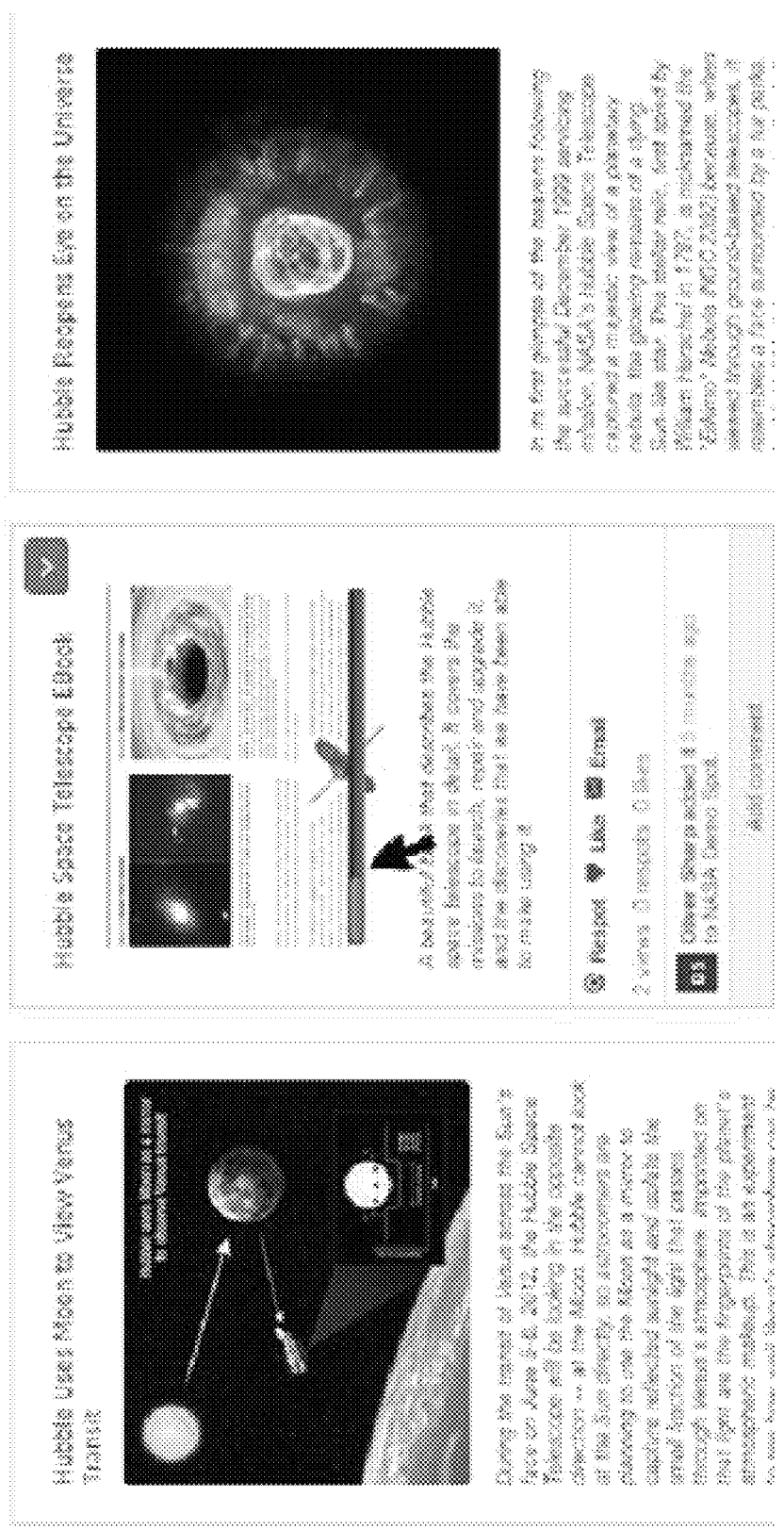
FIG. 4 is a display page illustrating skim preview applied to browsing a collection of items in accordance with some embodiments of the disclosed technology.

FIG. 4 is a display page illustrating skim preview applied to browsing a collection of items called a spot in accordance with some embodiments of the disclosed technology. The items shown are all associated with space exploration. The user has placed the cursor on a book about the Hubble space telescope to preview the contents of the book.

Search

Figure 5:
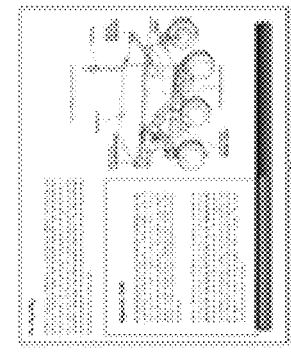
FIG. 5 is a display page illustrating skim preview in connection with search results in accordance with some embodiments of the disclosed technology.

Another way to find information is to search for it. FIG. 5 is a display page illustrating skim preview in connection with search results in accordance with some embodiments of the disclosed technology. Skim preview allows a user to preview the contents of search results, thereby providing more information than a static image and a short description can reveal. In this example, the user searched for the phrase "pathfinder", and the page shows the items that match that query. The user can move the cursor over each search result to use skim preview and preview contents of the search result.

Discovery

Figure 6:
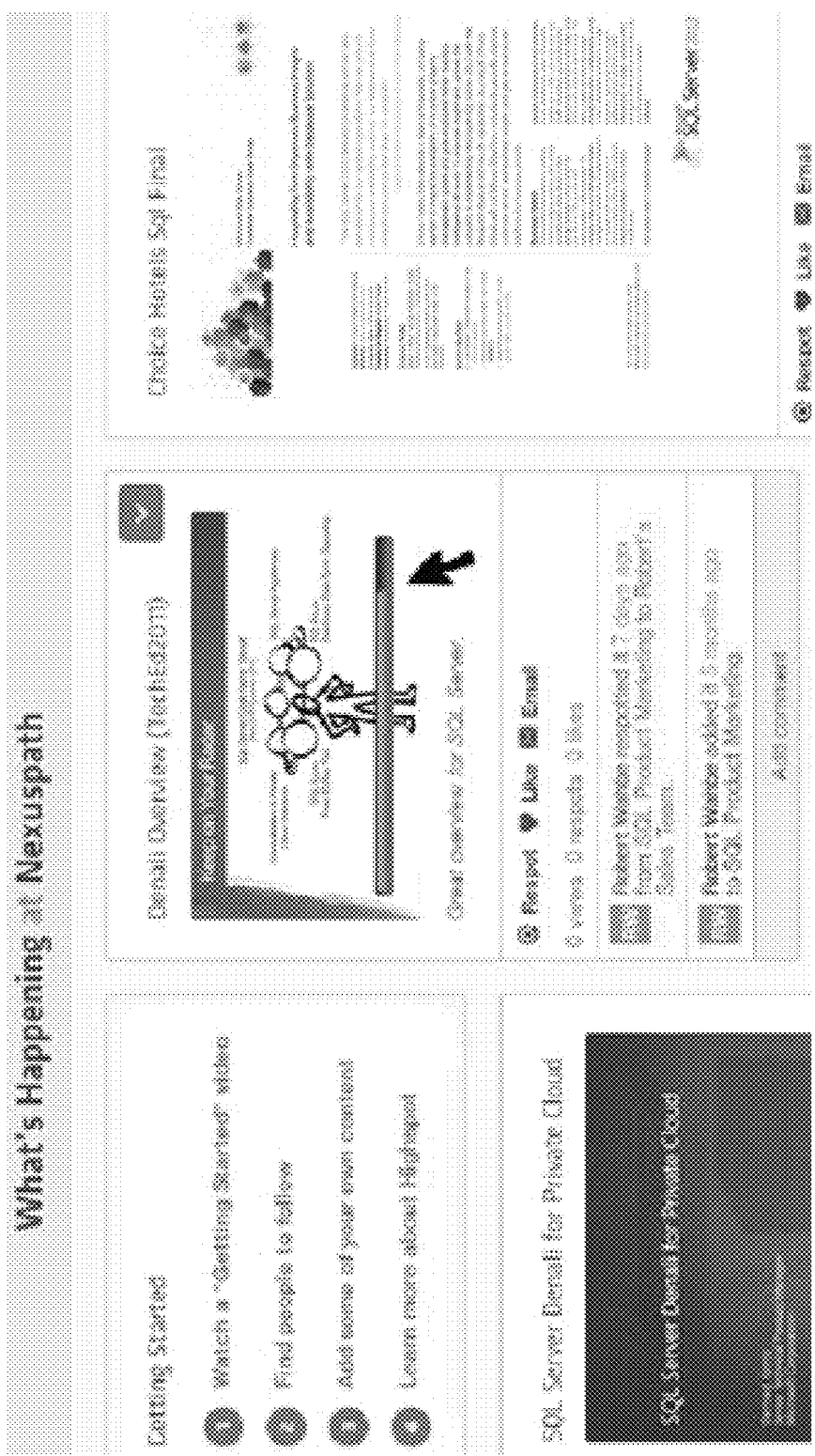
FIG. 6 is a display page illustrating skim preview in connection with a feed in accordance with some embodiments of the disclosed technology.

In discovery, the system suggests item to the user that they may be interested in. Skim preview supports discovery by allowing users to see not just a thumbnail and possibly a description of an item, but they can also slide their cursor across any item and preview contents of the item. A feed is a page that is automatically populated with items that the system determines the user might find interesting based on, for example, the user's expressed interests or browsing habits or an importance of the item using, for example, techniques disclosed in U.S. Provisional Patent Application Nos. 61/745,365, 61/800,042, 61/800,322, or 61/800,497, all of which are incorporated by reference in their entireties. FIG. 6 is a display page illustrating skim preview in connection with a feed in accordance with some embodiments of the disclosed technology. In some examples, the user can skim preview any item in a feed.

Organizing

Figure 7:
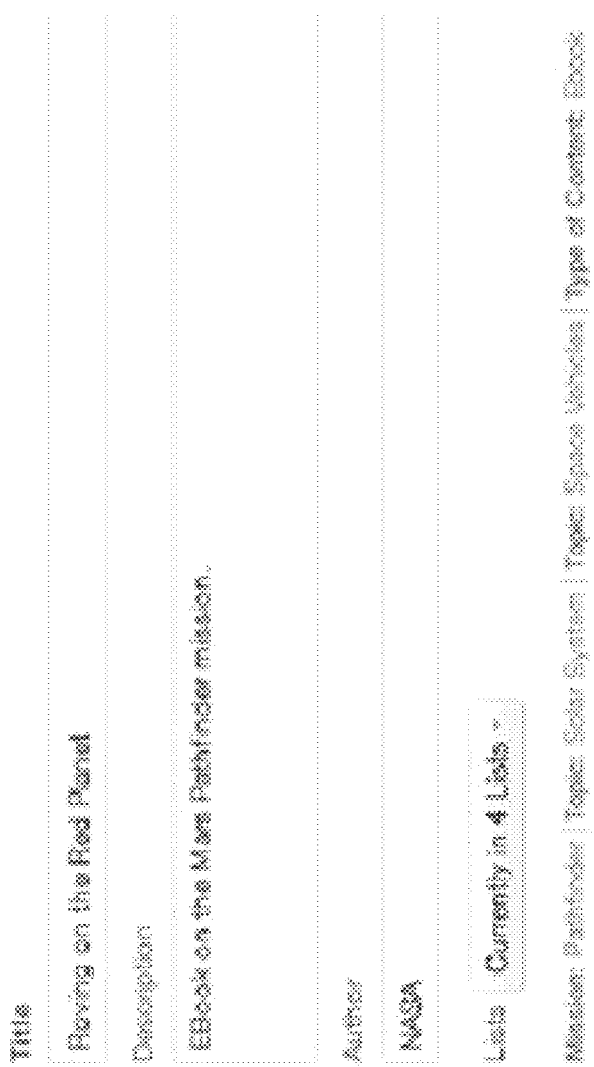
FIG. 7 is a display page illustrating the use of skim preview to view the contents of an item of information to quickly access its contents and create metadata for the item, to aid in finding, viewing, managing, and retrieving the item in accordance with some embodiments of the disclosed technology.

When a user is sharing items with other people or creating a repository for themselves, skim preview allows them to quickly learn more about the item and figure out, for example, the best way to organize it. FIG. 7 is a display page illustrating the use of skim preview to view the contents of an item of information to quickly access its contents and create metadata for the item, to aid in finding, viewing, managing, and retrieving the item in accordance with some embodiments of the disclosed technology. In FIG. 7, the user is editing the metadata for an item (e.g., its title, description, and so forth) and is assigning the item to lists and folders that collect related information together. The user can use skim preview to preview contents of the item to determine, for example, who the author of the item is, the title of the item, how to organize the item based on its contents, and so on.

Analyzing

Figure 8:
FIG. 8 is a display page illustrating skim preview in connection with an analysis of a particular collection of items in accordance with some embodiments of the disclosed technology.

Users may want to analyze the way that people are engaging with items. For example, they might want to find the most popular items in a collection, and understand how often they are being accessed or acted upon. FIG. 8 is a display page illustrating skim preview in connection with an analysis of a particular collection of items in accordance with some embodiments of the disclosed technology. In this example, FIG. 8 shows overall statistics for the collection, and detailed information about a particular item, summarizing how much activity has been associated with that item. The user is skim previewing the item to view its content within the context of the usage analysis.

Skim Implementation

In some embodiments, skim preview works by dividing the skim surface into ranges, each range corresponding to a particular preview image. For example, if there are four images to display, the first (e.g., left-most) fourth of the skim surface corresponds to page 1, the second fourth of the skim surface corresponds to page 2, and so on. When the cursor is hovering anywhere in the left-most fourth of the skim surface, the first preview image will be shown. That preview image will continue to be shown as the user moves the cursor to the right, until the cursor enters the second fourth of the skim surface. At that point, the currently-displayed preview image is replaced by the second preview image. If the cursor moves back into the first fourth, the first preview image is re-displayed and if the cursor moves further to the right into the third fourth, the third preview image is displayed. One of ordinary skill in the art will understand that the example provided above uses a one dimensional, horizontal sequence but that the example could be adapted to use a vertical sequence or a multidimensional sequence. In this example, the system waits for move events and each time a move event is received, the system checks to see whether the correct preview image is being displayed. If not, the system updates the display.

Preparation

In some embodiments, the system starts with the following values:

Integer DisplayWidth=width of the display area for preview images, in pixels

Integer NumPages=the number of pages to preview for this item

Image PreviewPages[1 . . . NumPages]=array of preview images

Integer LeftEdge=the pixel offset for the left edge of the skim surface

The PreviewPages array can be computed in a variety of ways. For example, the system might use a word processing program to generate a PDF file of the document. Each page of the PDF file could then be converted, using a graphics package like IMAGEMAGICK® by ImageMagick Studio LLC, into one of the preview images.

Next, the system computes the number of pixels that will be "allocated" to each image:
NumPixelsPerImage=DisplayWidth/NumPages
if (NumPixelsPerImage<1) then NumPixelsPerImage=1

Begin by displaying the first image in the PreviewPages array. Set up the viewing environment so that when the cursor moves across the preview image, events will be generated and sent to the routine ProcessMouseMove( ), shown below. For example, if this code is part of a web page that is being viewed in a browser such as Google Chrome, the browser will detect when the cursor is hovering over the item and will generate a JavaScript event that is routed to the code each time the cursor moves.

Handling Mouse Events

In some embodiments, the routine that processes the events works as follows:

```
ProcessMouseMove(Integer XLocation, Integer YLocation)
{
    // compute page to render
    Integer OffsetWithinSurface = XLocation – LeftEdge
    Integer PageToRender = OffsetWithinSurface / NumPixelsPerImage
    UpdateDisplayedImage(PreviewPages[PageToRender])
    UpdateProgressBar((PageToRender / NumPages) * 100)
}
```

UpdateDisplayedImage( ) is a function that displays the specified image. In some cases, the function may scale preview images to properly render the preview images in the allocated display area. For example, one or more preview images corresponding to elements of the item may be too tall to fit in the display area. In that case, the preview images can be scaled to fit the allocated display area, typically preserving the aspect ratio of the original. Note that different preview images within a single document may have different scales and aspect ratios. For example, suppose that the item being displayed is a PDF file containing the advertising material for a product launch. Different pages within the file may contain a large poster, a banner, portrait-formatted 8½"×11" brochure pages, and presentation slides in landscape format. To properly display such a mixture of images, the function can pad each preview image as well, so that the preview image will be shown in the center of the display area. Also, images often are no easily legible if they are scaled up, so the system will also pad preview images that are smaller than the display area.

The following display algorithm is configured to handle any mixture of image sizes and aspect ratios and maps each into a display area of any height and width. The height and width of the display area are specified in pixels by ViewingAreaHeight and ViewingAreaWidth. A pair of functions called PixelHeight and PixelWidth return the height and width in pixels of an image that is passed to them, respectively. When the image has been scaled and padded (as needed) to center it and to fit within both dimensions of the display area, the DisplayImage function is called, which takes four arguments: the image, the amount to scale down the image, the amount of horizontal padding to display to the left of the image, and the amount of vertical padding to display above the image. The DisplayImage( ) function arranges for the image to be rendered; in a browser, for example, the DisplayImage( ) function would update the image tag and associated HTML declarations on the web page to render the preview image with the appropriate padding and scaling specified.

```
UpdateDisplayedImage(Image)
{
    Float VerticalScale = PixelHeight(Image) / ViewAreaHeight
    Float HorizontalScale = PixelWidth(Image) / ViewAreaWidth
    Float Scaling
    Integer VerticalPadding = 0, HorizontalPadding = 0
    If (VerticalScale > HorizontalScale) {    // anchor scaling on height
        If (ViewAreaHeight > PixelHeight(Image)) {    // needs padding
            VerticalPadding = (ViewAreaHeight – PixelHeight(Image)) / 2
            Scaling = 1
        }
        Else
            Scaling = VerticalScale
        Integer DisplayWidth = PixelWidth(Image) / Scaling
        If (ViewAreaWidth > DisplayWidth)            // needs padding
            HorizontalPadding = (ViewAreaWidth – DisplayWidth) / 2
    }
    else {                                    // anchor scaling on width
        If (ViewAreaWidth > PixelWidth(Image)) {    // needs padding
            HorizontalPadding = (ViewAreaWidth –
                PixelWidth(Image)) / 2
            Scaling = 1
        }
        Else
            Scaling = HorizontalScale
        Integer DisplayHeight = PixelHeight(Image) / Scaling
        If (ViewAreaHeight > DisplayHeight)
            VerticalPadding = (ViewAreaHeight – DisplayHeight) / 2
    }
    DisplayImage(Image, Scaling, HorizontalPadding, VerticalPadding)
}
```

UpdateProgressBar( ) is a function that takes a percentage value and displays a progress bar showing that percentage completed.

To generalize this implementation into two dimensions, make the array of preview images two dimensional, and also compute the offset from YLocation to determine the value to use in the Y dimension. With reference to the above implementation, the ProcessMouseMove( ) function in two dimensions would work as follows:

```
ProcessMouseMoveIn2D(Integer XLocation, Integer YLocation)
{
    // compute page to render
    Integer HorizontalOffset = XLocation – LeftEdge
    Integer VerticalOffset = YLocation – TopEdge
    Integer HorizontalPage = HorizontalOffset / NumHorizPixelsPerImage
    Integer VerticalPage = VerticalOffset / NumVerticalPixelsPerImage
    UpdateDisplayedImage(PreviewPages[HorizontalPage,VerticalPage])
    UpdatePreviewIndicator(OriginalImage,
                HorizontalOffset, DisplayWidth,
                VerticalOffset, DisplayHeight)
}
```

This code uses an enhanced array of preview pages that is two-dimensional and, instead of a one-dimensional bar, displays a two-dimensional map of the total image along with an indicator to show where the current preview is located. UpdatePreviewIndicated( ) is a function that takes as arguments the original image that is being skimmed, the current mouse offsets horizontally and vertically, and the height and width of the display area. UpdatePreviewIndicated( ) shows an indicator to the user of the area of the image that is currently being previewed (an example is demonstrated in FIG. 3).

Enhancements

In some embodiments, the system uses predictive prefetch to optimize rendering time. The system can track the path of the cursor and predict where the user is most likely to go next. This might be based on extrapolating the existing path, or on historical patterns other users have followed. Based on the prediction, the preview images that would be needed next can be loaded ahead of time. Then, if the user does follow the predicted arc or arcs, the images are ready to be displayed immediately.

In some embodiments, the system visually weights items that are more important. The system can compute how likely a particular preview image is to contain content of interest to the user. For example, the system might estimate importance based on the amount of time that other users have spent looking at one part of the item vs. another with parts receiving more attention having a higher important than parts receiving less attention. In some embodiments, the system may estimate importance based on the behavior of users who have similar behavior to the current user. The system can adjust the visual weight of a preview based on estimated importance. For example, the size of the preview image might be adjusted such that preview images with high estimates of importance may be enlarged while preview images with low estimates of importance are reduced in size. In some embodiments, the percentage of the skim surface corresponding to a preview image may be proportional to the estimated importance of the preview image. For example, as the user moves the cursor across the skim surface at a constant speed, more important preview images are shown for a longer period of time than less important preview images. In this manner, preview images that a user is more likely to want to see, such as first pages of chapters within in a book or first screens/title screens of chapters within a film, may be displayed longer as part of the skim preview and, therefore, easier for the user to find.

In some embodiments, the system allows a user to adjust the images shown based on speed of cursor movement. If the user is moving the cursor quickly, it may not be useful to show all of the preview images as they will not be all legible. Accordingly, in some embodiments the system could present only certain images, rather than all of them. The system might also use visual weighting, as above, to determine the most important subset of the images to show.

In some embodiments, the system allows the user to view preview images based on how a presentation was viewed or presented. For example, if a presentation or document is sent to a customer (a pitch), the system records the slides that the customer viewed and the duration of each view. Later, the user can skim preview that pitch by sliding the mouse over a representation of the pitch. The system shows the slides or pages that were viewed, in the order they were viewed, optionally leaving the preview visible for a length corresponding to the duration of the customer view. By sliding the mouse across the representation of the pitch, the user can get a visual representation of what the customer viewed and how much time they spent looking at the various slides or pages. Similarly, if the user presents the pitch to the customer in real time (i.e., a live pitch), the system records the amount of time spent on each slide or page and on other material (such as a demo). By sliding the mouse over a representation of the live pitch, the user can get a recap of the presentation—such as which slides or pages were presented, in which order, for how long, and interleaved in what way with other material. Other users can also view the recap (such as another team member, the user's manager, etc.).

In some embodiments, the system allows the user to select the preview images. The user could select, for example, which frames from a video are to be used as preview images. Alternatively, the user could define "cover pages" for items—a customized initial preview image that is displayed before skim preview is activated. For example, the first slide of a presentation might not represent its content well—it might, for example, be notes to the audience about how long the presentation will be, but not describe the content. In that case, the user can choose a different slide to use as the initial preview (or cover page), or they might upload a custom image to use as the cover page instead. In some embodiments, the system may auto-compute each cover page and/or auto-detect that the default cover page is not a good one. The system may be able to recognize that the default first preview image is not a good one because, for example, the first preview image does not contain any text, is a video test pattern, is blank, etc. In response to determining that a cover page is not preferable, the system can use heuristics to choose a better cover page or to warn a user so that the user would know to choose a better cover page. For example, the system might search through the initial frames of a video until it finds a frame that is not a test pattern and is not blank, or one that has words on it. For a presentation, the system might look for a slide that contains words in a large font, and not just images or small text.

In some embodiments, the system may support skim preview of audio. For example, if an item includes an audio track (e.g. it is a sound clip, or a video with accompanying sound), the system may sample the audio by, for example, playing short bursts (e.g., a half second, one second, five seconds) of sound taken at periodic intervals from the original recording. The system might play a small fraction of each second of audio as the cursor is moved, allowing the user to hear an approximation of the sampled content as they skim across the item. The audio track might be all that a user experiences as the user skim previews, or the sampled audio might be played in conjunction with a visual skim previewing experience.

Figure 9:
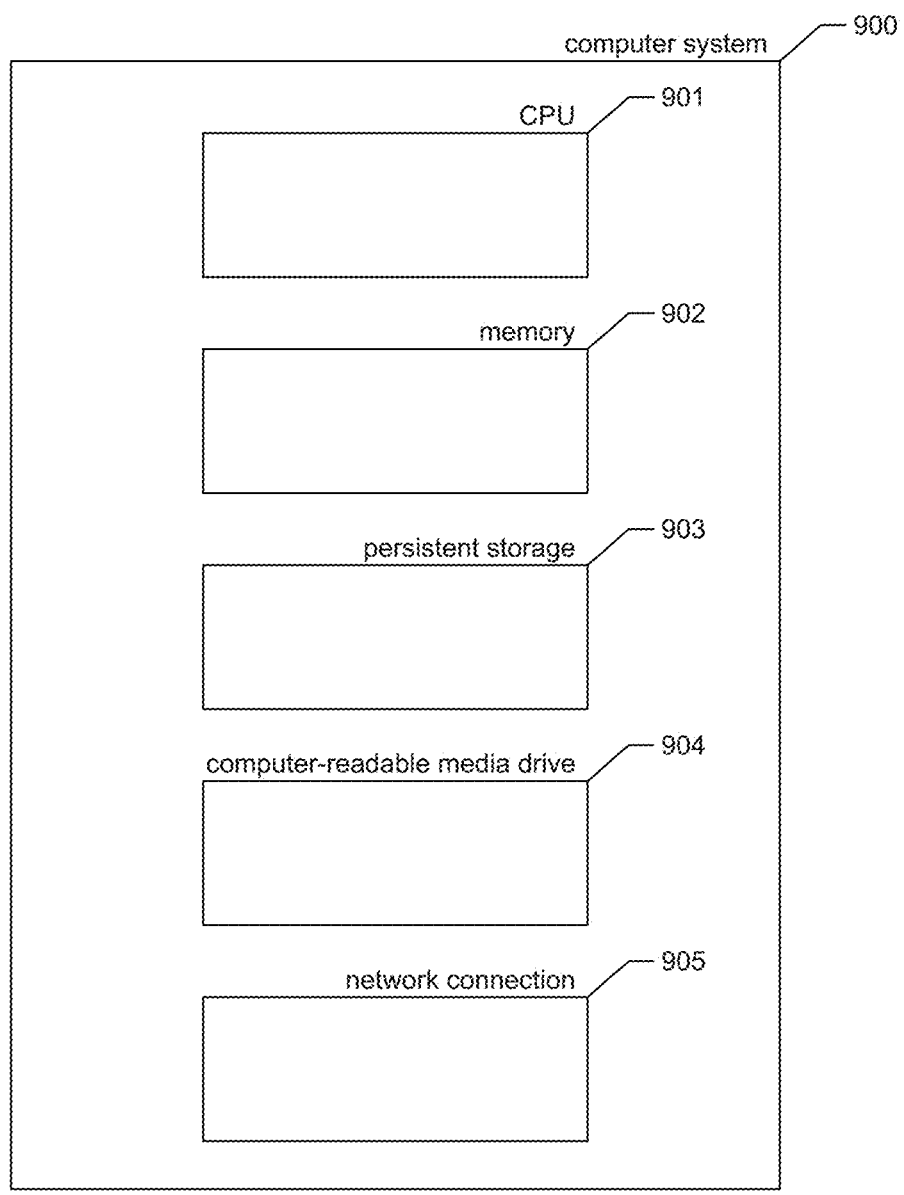
FIG. 9 is a block diagram illustrating some of the components that may be incorporated in at least some of the computer systems and other devices on which the system operates and interacts with in some embodiments of the disclosed technology.

FIG. 9 is a block diagram illustrating some of the components that may be incorporated in at least some of the computer systems and other devices on which the system operates and interacts with in some examples. In various examples, these computer systems and other devices 600 can include server computer systems, desktop computer systems, laptop computer systems, netbooks, tablets, mobile phones, personal digital assistants, televisions, cameras, automobile computers, electronic media players, and/or the like. In various examples, the computer systems and devices include one or more of each of the following: a central processing unit ("CPU") 601 configured to execute computer programs; a computer memory 602 configured to store programs and data while they are being used, including a multithreaded program being tested, a debugger, an operating system including a kernel, and device drivers; a persistent storage device 603, such as a hard drive or flash drive configured to persistently store programs and data; a computer-readable storage media drive 604, such as a floppy, flash, CD-ROM, or DVD drive, configured to read programs and data stored on a computer-readable storage medium, such as a floppy disk, flash memory device, a CD-ROM, a DVD; and a network connection 605 configured to connect the computer system to other computer systems to send and/or receive data, such as via the Internet, a local area network, a wide area network, a point-to-point dial-up connection, a cell phone network, or another network and its networking hardware in various examples including routers, switches, and various types of transmitters, receivers, or computer-readable transmission media. While computer systems configured as described above may be used to support the operation of the disclosed techniques, those skilled in the art will readily appreciate that the disclosed techniques may be implemented using devices of various types and configurations, and having various components. Elements of the disclosed systems and methods may be described in the general context of computer-executable instructions, such as program modules, executed by one or more computers or other devices. Generally, program modules include routines, programs, objects, components, data structures, and/or the like configured to perform particular tasks or implement particular abstract data types and may be encrypted. Moreover, the functionality of the program modules may be combined or distributed as desired in various examples. Moreover, display pages may be implemented in any of various ways, such as in C++ or as web pages in XML (Extensible Markup Language), HTML (HyperText Markup Language), JavaScript, AJAX (Asynchronous JavaScript and XML) techniques or any other scripts or methods of creating displayable data, such as the Wireless Access Protocol ("WAP").

The following discussion provides a brief, general description of a suitable computing environment in which the invention can be implemented. Although not required, aspects of the invention are described in the general context of computer-executable instructions, such as routines executed by a general-purpose data processing device, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," "host." "host system," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on computer-readable storage media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the invention may be distributed over the Internet or over other networks (including wireless networks), on a propagated signal on a computer-readable propagation medium or a computer-readable transmission medium (e.g., an electromagnetic wave(s), a sound wave, etc.) over a period of time, or they may be provided on any analog or digital network (packet switched, circuit switched, or other scheme). Non-transitory computer-readable media include tangible media such as hard drives, CD-ROMs, DVD-ROMS, and memories such as ROM, RAM, and Compact Flash memories that can store instructions and other storage media. Signals on a carrier wave such as an optical or electrical carrier wave are examples of transitory computer-readable media.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/ or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. §112(f), other aspects may likewise be embodied as a means-plus-function claim, or in other forms, such as being embodied in a computer-readable medium. (Any claims intended to be treated under 35 U.S.C. §112(f) will begin with the words "means for", but use of the term "for" in any other context is not intended to invoke treatment under 35 U.S.C. §112(f).) Accordingly, the applicant reserves the right to pursue additional claims after filing this application to pursue such additional claim forms, in either this application or in a continuing application.

We claim:

1. A method, performed by a computing system having a memory and a processor, for generating a skim preview of an information item, the method comprising:
   identifying a plurality of information items, wherein identifying the plurality of information items comprises:
   determining use data that characterizes relationships among information items within an organization,
   wherein the information items include user data and collections of information items, and
   wherein the organization Includes a structured body of users with associated roles within the organization and who have access to the information items, and
   generating interest data indicating affinity among the information items based on the determined use data;
   for each of a plurality of the identified information items, providing for display an indication of the information item;
   receiving a selection of one of the plurality of information Items;
   generating a sequence of preview images corresponding to the selected one of the plurality of information items;
   receiving, from a user, input relative to the indication of the selected information item,
      wherein the selected information item has an associated skim surface and wherein receiving, from a user, input relative to the indication of the selected information item comprises:
   tracking movement of a cursor or other pointing mechanism relative to the skim surface,
      wherein the skim surface is divided into a plurality of ranges;
   selecting, from among the generated sequence of preview images, a preview image for the selected information item based at least in part on the received input relative to the indication of the selected information item; and
   providing the selected preview image for display.

2. The method of claim 1, wherein the received input relative to the indication of the selected information item corresponds to the location of a cursor associated with a pointing device, the method further comprising:
   In response to determining that the cursor has moved,
      selecting a preview image based at least in part on the moved cursor, and
      providing for display the preview image selected based at least in part on the moved cursor.

3. The method of claim 1, wherein selecting a preview image based at least in part on the received input relative to the indication of the selected information item comprises:
   determining a width of the indication of the selected information item; and
   selecting a preview image based on the determined width of the indication of the selected information item and the location of a cursor representative of the received user input.

4. The method of claim 1, wherein the sequence of images is a two-dimensional sequence of images and wherein selecting a preview image based at least in part on the received input relative to the indication of the selected information item comprises:
   determining a width of the indication of the selected information item;
   determining a height of the indication of the selected information item; and
   selecting a preview image based on at least in part the determined width of the indication of the selected Information Item, the determined height of the indication of the selected information item, and the location of a cursor representative of the received user input.

5. The method of claim 1, wherein identifying the plurality of information items further comprises:
   receiving a query for data regarding the information items; and
   responding to the query by providing one or more results based on the generated interest data.

6. The method of claim 1, wherein the selected information item is a pitch containing a plurality of slides and wherein generating the sequence of preview images comprises determining the length for which each of two or more of the slides were previously viewed.

7. The method of claim 1, wherein the selected information item is a presentation or document containing a plurality of slides or pages and wherein generating the sequence of preview images comprises generating a preview image for one or more of the plurality of slides or pages.

8. The method of claim 1, wherein the selected information item is a pitch containing a plurality of slides and wherein generating the sequence of preview images comprises determining the order in which two or more of the slides were previously viewed.

9. A computer-readable storage medium storing instructions that,
   if executed by a computing system having a processor, cause the computing system to perform a method for generating a skim preview of an information item, the method comprising:

identifying a plurality of information items, wherein identifying the plurality of information items comprises:
   determining use data that characterizes relationships among information items within an organization,
      wherein the information items include user data and collections of information items, and
      wherein the organization includes a structured body of users with associated roles within the organization and who have access to the information items, and
   generating interest data indicating affinity among the information items based on the determined use data;
providing for display an indication of at least one identified information item;
generating a sequence of previews corresponding to the at least one information item;
receiving, from a user, input relative to the indication of the at least one information item,
   wherein the at least one information item has an associated skim surface, and
   wherein receiving, from a user, input relative to the indication of the at least one information item comprises:
   tracking movement of a cursor or other pointing mechanism relative to the skim surface,
      wherein the skim surface is divided into a plurality of ranges;
   selecting a preview based at least in part on the received input relative to the indication of the at least one information item; and
providing for display the selected preview.

10. The computer-readable storage medium of claim 9, wherein the at least one information item is a collection of documents and wherein generating the sequence of previews comprises generating a preview page for each document in the collection of items.

11. The computer-readable storage medium of claim 10, wherein the previews are sorted by popularity in the sequence of previews.

12. The computer-readable storage medium of claim 10, wherein the previews are sorted chronologically in the sequence of previews.

13. The computer-readable storage medium of claim 9, wherein providing the selected preview for display comprises:
   determining an importance value for the selected preview; and
   displaying the selected preview based at least in part on the determined importance value for the selected preview.

14. The computer-readable storage medium of claim 9, wherein the at least one identified information item is a document containing a plurality of pages and wherein generating the sequence of preview images comprises generating a preview image for one or more of the plurality of pages.

15. A computing system, having a memory and a processor, for
   generating a skim preview of an information item, the computing system comprising:
   a component configured to identify a plurality of information items, comprising:
      a component configured to determine use data that characterizes relationships among information items within an organization;
         wherein the information items include user data and collections of information items, and
         wherein the organization includes a structured body of users with associated roles within the organization and who have access to the information items, and
      a component configured to generate interest data indicating affinity among the information items based on the determined use data;
   a component configured to, for each of a plurality of identified information items, provide for presentation an indication of the information item;
   a component configured to receive a selection of one of the plurality of information items;
   a component configured to generate a sequence of previews corresponding to the selected one of the plurality of information items;
   a component configured to receive input relative to the indication of the selected information item,
      wherein the selected information item has an associated skim surface, and wherein receiving, from a user, input relative to the indication of the selected information item comprises:
      tracking movement of a cursor or other pointing mechanism relative to the skim surface, wherein the skim surface is divided into a plurality of ranges;
   a component configured to select a preview based at least in part on the received input relative to the indication of the selected information item; and
   a component configured to provide for presentation the selected preview,
   wherein each component comprises computer-executable instructions stored in the memory for execution by the computing system.

16. The computing system of claim 15, further comprising:
   a component configured to predict a path of user input based at least in part on a first location of a cursor and a second location of a cursor.

17. The computing system of claim 16, further comprising:
   a component configured to generate at least one preview based at least in part on the predicted path of user input.

18. The computing system of claim 15, wherein each indication of an information item is a search result.

19. The computing system of claim 15, further comprising:
   a component configured to generate a progress bar indicative of where in the selected information item the selected preview is relative to the selected information item as a whole.

20. The computing system of claim 15, wherein the selected information item is a presentation containing a plurality of slides and wherein generating the sequence of preview images comprises generating a preview image for one or more of the plurality of slides.

21. The method of claim 1, wherein the selected one of the plurality of information items comprises a plurality of pages or slides, and wherein generating the sequence of preview images corresponding to the selected one of the plurality of information items comprises:
   selecting at least a subset of the plurality of pages or slides of the selected one of the plurality of information items; and
   for each of the selected pages or slides of the selected one of the plurality of information items, generating a preview image for the selected page or slide.

\* \* \* \* \*

UNITED STATES PATENT AND TRADEMARK OFFICE
CERTIFICATE OF CORRECTION

PATENT NO. : 9,710,434 B2
APPLICATION NO. : 14/566515
DATED : July 18, 2017
INVENTOR(S) : Oliver Sharp et al.

Page 1 of 1

It is certified that error appears in the above-identified patent and that said Letters Patent is hereby corrected as shown below:

In the Specification

In Column 5, Line 26, delete "use" and insert -- user --, therefor.

In Column 7, Line 50, delete "no" and insert -- not --, therefor.

In Column 11, Line 41, delete ""host."" and insert -- "host," --, therefor.

In the Claims

In Column 13, Line 57, in Claim 1, delete "Items;" and insert -- items; --, therefor.

In Column 13, Line 63, in Claim 1, delete "surface" and insert -- surface, --, therefor.

In Column 14, Line 12, in Claim 2, delete "In" and insert -- in --, therefor.

In Column 14, Line 38, in Claim 4, delete "Information Item," and insert -- information item, --, therefor.

Signed and Sealed this
Tenth Day of April, 2018

Andrei Iancu
*Director of the United States Patent and Trademark Office*